US011132173B1

United States Patent
Borelli et al.

(10) Patent No.: US 11,132,173 B1
(45) Date of Patent: Sep. 28, 2021

(54) NETWORK SCHEDULING OF STIMULUS-BASED ACTIONS

(71) Applicant: Amazon Technologies, Inc., Seattle, WA (US)

(72) Inventors: Adam Frederick Borelli, San Francisco, CA (US); Grady Thomas Karp, Seattle, WA (US); Marcello Typrin, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 949 days.

(21) Appl. No.: 14/185,356

(22) Filed: Feb. 20, 2014

(51) Int. Cl.
*G06F 3/16* (2006.01)
*G06F 3/048* (2013.01)
*G10L 21/10* (2013.01)

(52) U.S. Cl.
CPC .............. *G06F 3/167* (2013.01); *G06F 3/048* (2013.01); *G10L 21/10* (2013.01)

(58) Field of Classification Search
CPC ....... G10L 21/10; H04L 41/22; H04L 12/282; B60H 1/00
See application file for complete search history.

(56) References Cited

U.S. PATENT DOCUMENTS

| | | | | |
|---|---|---|---|---|
| 5,566,339 A | * | 10/1996 | Perholtz | G06F 1/26 379/38 |
| 6,300,863 B1 | * | 10/2001 | Cotichini | G06F 11/006 340/10.42 |
| 6,473,407 B1 | * | 10/2002 | Ditmer | G06F 11/0709 370/252 |
| 6,832,341 B1 | * | 12/2004 | Vijayan | G06F 11/0709 709/224 |
| 6,903,723 B1 | * | 6/2005 | Forest | A61F 4/00 345/157 |
| 7,327,723 B2 | * | 2/2008 | Kurganov | H04M 7/0033 370/352 |
| 7,418,392 B1 | | 8/2008 | Mozer et al. | |

(Continued)

FOREIGN PATENT DOCUMENTS

WO  WO2011088053 A2  7/2011

OTHER PUBLICATIONS

Grebler, L. "Ubi—The Ubiquitous Computer—Voice-Activated and Always On", Jan. 21, 2013, http://web.archive.org/web/20130121102824/http://www.kickstarter.com/projects/607691307/ubi-the-ubiquitous-computer-voice-activated-and-al-0.*

(Continued)

*Primary Examiner* — Kieu D Vu
*Assistant Examiner* — Alvaro R Calderon, IV
(74) *Attorney, Agent, or Firm* — Lee & Hayes, P.C.

(57) ABSTRACT

A speech-based service platform includes a local device in a user premises and a network-based control service that directs the local device to perform actions for a user. The user may at times request that the service schedule a notification or other action at a specified future time or in response to other stimuli that may occur in the future. Upon receiving a request from the user, the control service immediately instructs the local device to schedule the notification or other action. If the control service is unable to contact the local device, however, the request is canceled and the user is notified that the action has not been scheduled. Non-priority actions requested by the user may be accepted and implemented at the local device when communications become available.

24 Claims, 2 Drawing Sheets

(56) References Cited

U.S. PATENT DOCUMENTS

| | | | |
|---|---|---|---|
| 7,720,683 B1 | 5/2010 | Vermeulen et al. | |
| 7,774,204 B2 | 8/2010 | Mozer et al. | |
| 8,054,171 B1* | 11/2011 | Lanzafame | G05B 23/027 340/458 |
| 8,060,792 B2* | 11/2011 | Sivasubramanian | G06F 9/5061 714/47.1 |
| 8,086,356 B2* | 12/2011 | Al-Mutawa | G06F 1/26 700/291 |
| 8,234,377 B2* | 7/2012 | Cohn | G06F 9/5061 709/223 |
| 8,260,840 B1* | 9/2012 | Sirota | G06F 9/5061 370/216 |
| 8,296,419 B1* | 10/2012 | Khanna | G06F 9/5072 709/201 |
| 8,321,558 B1* | 11/2012 | Sirota | G06F 9/5011 709/201 |
| 8,332,365 B2* | 12/2012 | McAlister | G06F 11/1471 707/674 |
| 8,346,921 B1* | 1/2013 | Goodspeed | G06Q 30/02 709/200 |
| 8,370,493 B2* | 2/2013 | Sirota | G06F 9/485 709/201 |
| 8,380,999 B1* | 2/2013 | Robison | H04W 52/0261 320/120 |
| 8,381,264 B1* | 2/2013 | Corddry | H04L 67/22 726/3 |
| 8,543,834 B1* | 9/2013 | Barra | G06F 21/32 713/182 |
| 8,595,642 B1* | 11/2013 | Lagassey | G06F 3/048 704/275 |
| 2002/0026320 A1* | 2/2002 | Kuromusha | G06F 3/0481 704/270 |
| 2002/0055844 A1* | 5/2002 | L'Esperance | H04M 1/271 704/260 |
| 2004/0030753 A1* | 2/2004 | Horvitz | G05B 19/404 709/206 |
| 2004/0176667 A1* | 9/2004 | Mihai | A61B 5/0002 600/300 |
| 2005/0027538 A1* | 2/2005 | Halonen | H04M 1/72561 704/275 |
| 2006/0248183 A1* | 11/2006 | Barton | H04L 51/24 709/224 |
| 2007/0239987 A1* | 10/2007 | Hoole | H04L 63/102 713/169 |
| 2008/0066080 A1* | 3/2008 | Campbell | G06F 17/3089 719/314 |
| 2008/0115141 A1* | 5/2008 | Welingkar | G06F 9/5011 718/104 |
| 2008/0115152 A1* | 5/2008 | Welingkar | G06F 17/30575 719/322 |
| 2008/0184234 A1* | 7/2008 | Vutharkar | H04L 41/028 718/100 |
| 2009/0005071 A1* | 1/2009 | Forstall | G06F 3/0481 455/456.1 |
| 2009/0204977 A1* | 8/2009 | Tavares | G06F 9/542 719/318 |
| 2010/0199131 A1* | 8/2010 | Yoshida | G06F 11/008 714/54 |
| 2011/0066941 A1* | 3/2011 | Chipchase | G06F 3/167 715/716 |
| 2011/0078411 A1* | 3/2011 | Maclinovsky | G06Q 10/06 712/30 |
| 2011/0098637 A1* | 4/2011 | Hill | A61M 5/14244 604/66 |
| 2011/0098638 A1* | 4/2011 | Chawla | A61M 5/14244 604/66 |
| 2011/0098674 A1* | 4/2011 | Vicente | A61M 5/14244 604/504 |
| 2011/0173537 A1* | 7/2011 | Hemphill | G06F 17/30038 715/716 |
| 2011/0205062 A1* | 8/2011 | Pesot | A61B 5/0006 340/573.1 |
| 2011/0239011 A1* | 9/2011 | Waris | H04L 12/12 713/310 |
| 2011/0301943 A1* | 12/2011 | Patch | G10L 15/26 704/9 |
| 2012/0016678 A1* | 1/2012 | Gruber | G06F 17/3087 704/275 |
| 2012/0079606 A1* | 3/2012 | Evans | G06F 21/10 726/28 |
| 2012/0215531 A1* | 8/2012 | Grobauer | G06F 3/038 704/231 |
| 2012/0216134 A1* | 8/2012 | Neubacher | G06F 3/038 715/764 |
| 2012/0223885 A1 | 9/2012 | Perez | |
| 2012/0245447 A1* | 9/2012 | Karan | A61B 5/14532 600/365 |
| 2013/0085755 A1* | 4/2013 | Bringert | G10L 15/28 704/235 |
| 2013/0132854 A1* | 5/2013 | Raleigh | G06F 3/0482 715/738 |
| 2013/0144944 A1* | 6/2013 | Wohlert | G06Q 50/01 709/204 |
| 2013/0156168 A1* | 6/2013 | Lingam | H04M 1/72563 379/88.16 |
| 2013/0226580 A1* | 8/2013 | Witt-Ehsani | G06F 3/167 704/244 |
| 2013/0239015 A1* | 9/2013 | Forest | A61F 4/00 715/752 |
| 2013/0275875 A1* | 10/2013 | Gruber | G10L 15/22 715/728 |
| 2014/0067403 A1* | 3/2014 | Burke | G10L 15/22 704/275 |
| 2014/0142963 A1* | 5/2014 | Hill | G06F 19/3418 705/2 |
| 2014/0207452 A1* | 7/2014 | Klein | G06F 3/0304 704/235 |
| 2014/0229752 A1* | 8/2014 | Lee | G06F 1/3206 713/323 |
| 2014/0253319 A1* | 9/2014 | Chang | H04M 1/72522 340/521 |
| 2014/0253455 A1* | 9/2014 | Mauro | G06F 3/167 345/169 |
| 2014/0257807 A1* | 9/2014 | Mauro | G10L 21/06 704/235 |
| 2015/0040012 A1* | 2/2015 | Faaborg | G10L 15/22 715/728 |
| 2015/0106089 A1* | 4/2015 | Parker | G06F 1/3206 704/235 |
| 2015/0179186 A1* | 6/2015 | Swierk | G06F 3/167 704/276 |
| 2015/0212664 A1* | 7/2015 | Freer | G06F 3/0482 705/14.54 |
| 2015/0245154 A1* | 8/2015 | Dadu | G06F 3/167 381/56 |

OTHER PUBLICATIONS

Langtree, I. "Ubi Voice-activated Computer Will Benefit People with Disabilities and Elderly", Nov. 20, 2012, http://web.archive.org/web/20121120161740/http://www.disabled-world.com/assistivedevices/computer/ubi.php.*

"Ubiquitous computing", Feb. 13, 2013, Wikipedia.org, http:/tweb.archive.orgfweb/20130213113539/http:l/en.Wikipedia.orgfwiki/Ubiqt.itous com puling.*

Mousa, A. "Ubiquitous/Pervasive Computing", International Journal of Innovative Research & Development, http://www.itu.int/en/Lists/consultation2015/Attachments/41/45.3104.pdf.*

"SmartThings", Feb. 14, 2014, http://web.archive.org/web/20140214112600/http://www.smartthings.com/.*

"SmartThings Channel", Jan. 22, 2014, IFTTT.com, http://web.archive.org/web/20140122054645/https://ifttt.com/smartthings.*

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(56) References Cited

OTHER PUBLICATIONS

Yorke-Smith, et al., The Design of a Proactive Personal Agent for Task Management, World Scientific Publishing Company, International Journal on Artificial Intelligence Tools, vol. 21, No. 1, 2012 30 pages.

* cited by examiner

NETWORK SCHEDULING OF STIMULUS-BASED ACTIONS

BACKGROUND

Homes, offices, automobiles, and public spaces are becoming more wired and connected with the proliferation of devices that rely on network-based services for some or all of their functionality. For example, home media devices often obtain video and/or audio content from online, network-based sources rather than relying on local storage of such content. One disadvantage of these devices, however, is that they may cease to function during periods of network unavailability or network-based control service outages.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
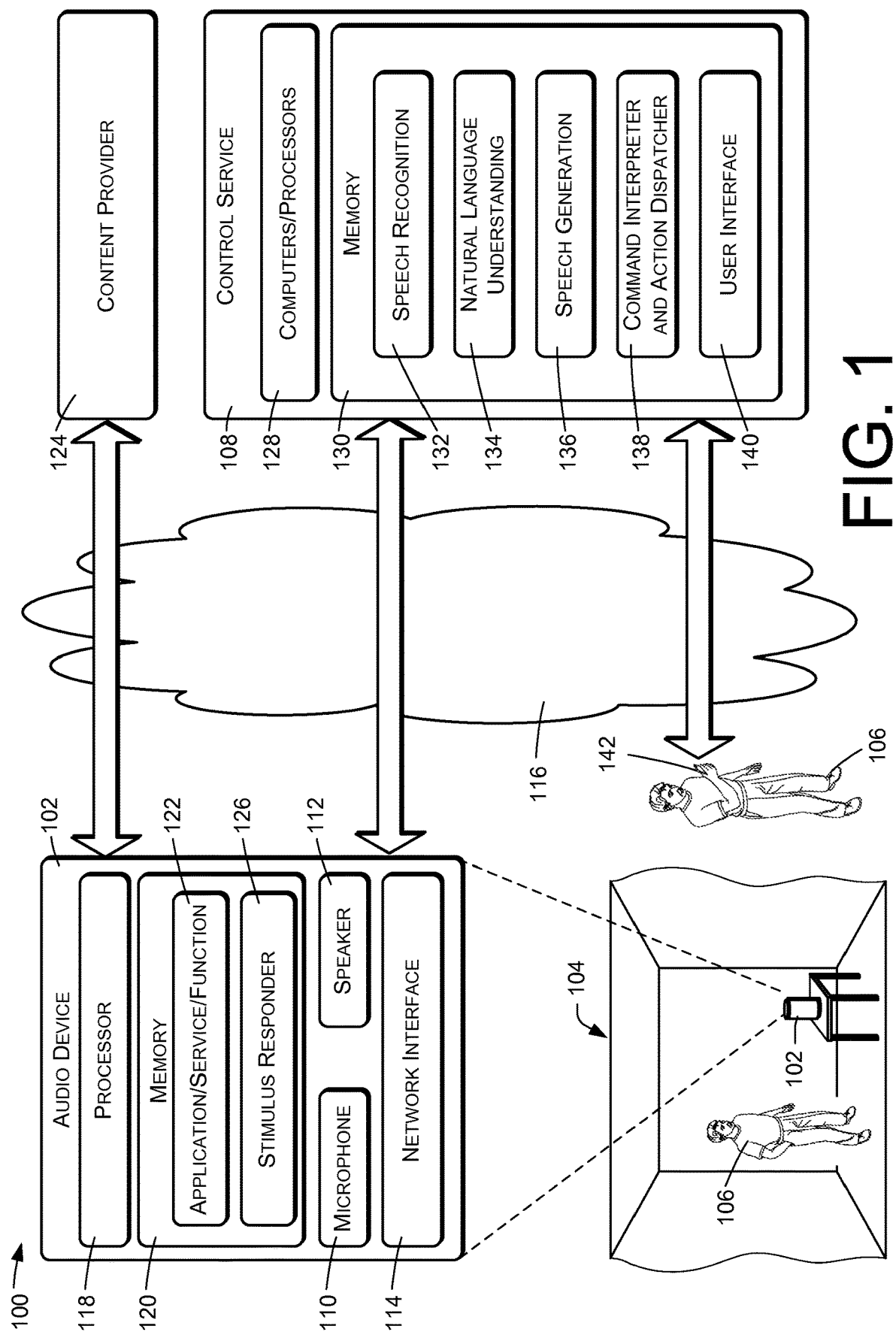
FIG. 1 is a block diagram of a voice-based service platform that includes a local audio device, a network-based control service, and a personal user device that may be used to control certain aspects of the platform.

This disclosure pertains generally to a system that interacts with users through speech to provide functions and services within the premises of the users. The system uses a central, network-based control service that communicates with and controls a local, speech-based audio device located in a home or other user premises. The audio device captures audio containing user speech and provides the audio to the control service. The control service recognizes user speech in the audio, determines user intent, and performs actions in fulfillment of the user intent. The actions may include scheduling alarms and other notifications that are to be issued by audio device. The local device may also in some cases be capable of controlling home devices and appliances, initiating network functions, activating visual indicators, displaying visual content, and so forth.

Certain functions of the system may be controlled from a personal user device such as a smartphone, computer, tablet computer, or other device. The user device may present a graphical or text-based user interface that allows the user to control certain aspects of the system. The user interface presented by the user device may accept or solicit information from the user regarding desired activities or functions to be performed by the control service and/or the in-home audio device.

Functions performed in the user premises by the local device may in many cases be in direct and immediate response to instructions received from the control service. That is, many of the operating characteristics of the local device are controlled from the control service. This allows the operating logic of the local device to be relatively simple. In the described embodiment, the control service performs speech recognition, interprets user intent, determines functions and actions to be performed by the audio device, generates speech responses to be rendered by the audio device, instructs the local device to initiate functions, and so forth.

Although the local audio device generally initiates functionality in response to specific instructions from the control service, certain situations may call for the local device to initiate functions even in the absence of real-time instructions from the control service. Specifically, certain actions may be relatively important and may need to be reliably performed even in the absence of available network communications between the audio device and the control service. More specifically, the user may wish for certain actions to be performed by the local device in response to locally known or detected stimuli.

Notifications, including alarms, form a category of actions that may need to be initiated locally by the audio device in response to time-based stimuli or event-based stimuli. A user may interact through the audio device or the user device to request that a notification be performed by the audio device at some future time. For example, the user may indicate that a wake-up alarm should be issued at 7 o'clock tomorrow morning. Implementation of the wake-up alarm may comprise playing music or other audio. Similarly, the user may request that a notification be issued upon detection of an event, status, or condition.

Rather than sending an instruction to the audio device at the indicated time or upon occurrence of the specified stimulus, the control service may be configured to send a command to the audio device well before the conditions specified for the notification. The audio device may then assume responsible for issuing the notification at the appropriate time. This increases reliability of the system for relatively critical functions such as an alarms, ensuring that the alarms will be issued as scheduled even if network communications between the audio device and the control service are not available at the scheduled or indicated time of the alarm.

Actions performed locally in this manner by the audio device may include notifications, home automation actions, network functions, device control actions, and so forth. Stimuli may include times as mentioned above, and/or may also include detected events such as motion, various types of audio or user utterances including speech, sensor activations, user actions, etc.

In some cases, the user may attempt to schedule a stimulus-dependent notification or other action at a time when the control service is not able to communicate with the local audio device. For example, the audio device may not be powered on or may be experiencing a network outage. In these cases, scheduling requests submitted by the user are rejected or canceled and the user is informed that the attempt to schedule the action has been unsuccessful. This behavior ensures that the user is not misled into thinking that a critical action has been scheduled, when in fact there is a possibility that the control service will not be able to schedule or implement the action before the time at which the action is to be performed.

Stimulus-based actions may be classified as priority or non-priority actions. Some actions, such as alarms, may be considered important or critical, while others may be less important. When a user attempts to schedule a priority action, the system may respond as indicated above when communications between the control service and the audio device are not available. When a user attempts to schedule a non-priority action, however, the system may indicate to the user that the action will be implemented if possible, even if network communications with the audio device are not currently available. In these cases, the control service queues the user's attempt to schedule the action and provides appropriate commands to the audio device if or when communications with the audio device become available.

FIG. 1 shows an example of a voice-based platform or system 100. The system 100 may include or may utilize a local audio user interface device 102 that is capable of playing various types of audio. The audio interface device 102, also referred to as an audio device 102, may be local to and/or located within an environment 104 such as a home or other premises to provide services for a user 106 within the environment 104. The audio device 102 may operate in conjunction with and/or under the control of a remote, network-based or network-accessible control service 108 that is configured to receive environmental audio from the audio device 102, to recognize speech in the received audio, and to perform or initiate functions or services in response to the recognized speech. Such functions or services may be implemented by the control service 108 independently of the audio device 102, and/or may be implemented by providing a command to the audio device 102 for local execution by the audio device 102. For example, the control service 108 may instruct the audio device 102 to play music, speech, or other audio content specified by the control service 108.

The audio device 102 may have one or more microphones 110 and one or more audio speakers or transducers 112 to facilitate audio interactions with the user 106. The audio device 102 may have a network communications interface 114 for communications over a communications network 116 with the control service 108. The communications network 116 may comprise a public, wide-area network such as the Internet or may comprise any of various other types of public and private networks that extend beyond the local premises of the user 106. Additionally, the communications interface 114 may communicate locally over a local-area network within the user premises.

In certain embodiments, the primary mode of user interaction with the audio device 102 and control service 108 is through speech. For example, the audio device 102 may receive spoken command expressions from the user 106 and the control service 108 may provide services in response to the commands. The user may speak a predefined wake or trigger expression (e.g., "Awake"), which may be followed by commands or instructions (e.g., "I'd like to go to a movie. Please tell me what's playing at the local cinema."). Provided services may include performing actions or activities, rendering media, obtaining and/or providing information, providing information via generated or synthesized speech via the audio device 102, initiating Internet-based services on behalf of the user 106, and so forth.

The audio device 102 includes operational or control logic, which in many cases may comprise a processor 118 and memory 120. The processor 118 may include multiple processors and/or a processor having multiple cores. The processor 118 may also comprise or include a digital signal processor for processing audio signals.

The memory 120 may contain applications and programs in the form of computer-executable instructions that are executed by the processor 118 to perform acts or actions that implement desired functionality of the audio device 102, including the functionality that is specifically described below. The memory 120 may be a type of non-transitory computer-readable storage media and may include volatile and nonvolatile memory. Thus, the memory 120 may include, but is not limited to, RAM, ROM, EEPROM, flash memory, or other memory technology.

The audio device 102 may include a plurality of applications, services, and/or functions 122, referred to collectively below as functional components 122, which reside in the memory 120 and are executable by the processor 118 to provide services and functionality. The functional components 122 may include a media playback component such as a media player that obtains music and/or other content from a network-based content provider 124 and plays the content on the speaker 112 of the audio device 102. Generally, such content may comprise audio and/or visual content, including music, video, text, speech, documents, pictures, instructions, information, data, and so forth.

The audio device 102 may also include a component or function referred to as a stimulus responder 126, which may be set or configured in response to user commands to perform actions upon detecting specified stimuli. As an example, the stimulus responder 126 may be set to issue an alarm or other notification at a specified time, after an elapsed time, or upon detection of an event, status, or condition. As another example, the stimulus responder 126 may be set perform a home automation action such as turning on lights at a specified time or in response to a detected condition such as presence of the user 106, motion within the environment 104, or any other condition such as might be detected within the environment 104. In some cases, a stimulus may comprise an event or condition observed or detected through network communications with local devices and/or remote providers or services such as weather services, traffic services, online merchants, stock brokerages, and so forth.

When configured to issue an alarm or notification, the stimulus responder 126 may implement such an alarm or notification in the form of rendered audio such as music, spoken word, radio stations, or other content, which may reside locally on the audio device 102 or may be obtained from the content provider 124.

The control service 108 may in some instances be part of a network-accessible computing platform that is maintained and accessible via the network 116. Network-accessible computing platforms such as this may be referred to using terms such as "on-demand computing", "software as a service (SaaS)", "platform computing", "network-accessible platform", "cloud services", "data centers", and so forth. The control service 108 may be configured to provide services to large numbers of audio devices 102 in the homes or premises of different users.

The audio device 102 and/or the control service 108 may communicatively couple to the network 116 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 116 is representative of any type of communication network, including data and/or voice networks, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

The control service 108 generally provides functionality for receiving an audio stream from the audio device 102, recognizing speech in the audio stream, determining user intent from the recognized speech, and performing an action or service in response to the user intent. The action or service may in some cases be performed in conjunction with the audio device 102 and in these cases the control service 108 may return a response to the audio device 102 indicating a command that is to be executed by the audio device 102 or a function that is to be performed by the audio device 102.

The control service 108 includes operational or control logic, which in many cases may comprise one or more servers, computers, and or processors 128. The control service 108 may also have memory 130 containing applications and programs in the form of instructions that are executed by the processor 128 to perform acts or actions that implement desired functionality of the control service 108, including the functionality specifically described herein. The memory 130 may be a type of computer storage media and may include volatile and nonvolatile memory. Thus, the memory 130 may include, but is not limited to, RAM, ROM, EEPROM, flash memory, or other memory technology. In certain implementations, the control service 108 may comprise a plurality of servers configured to communicate with multiple audio devices 102 over the Internet.

Among other logical and physical components not specifically shown, the control service 108 may comprise speech recognition components 132. The speech recognition components 132 may include automatic speech recognition (ASR) functionality that recognizes human speech in an audio signal provided by the audio device 102 from the microphone 110.

The control service 108 may also comprise a natural language understanding component (NLU) 134 that determines user intent based on user speech that is recognized by the speech recognition components 132.

The control service 108 may further comprise a speech generation component 136 that synthesizes or otherwise produces speech audio. For example, the speech generation component 136 may comprise a text-to-speech component that produces speech to be played on the speaker 112 of the audio device 102.

The control service 108 may also comprise a command interpreter and action dispatcher 138 (referred to below simply as a command interpreter 138) that determines functions or commands corresponding to user intents. In some cases, commands may correspond to functions that are to be performed at least in part by the audio device 102, and the command interpreter 138 may in those cases provide device commands to the audio device 102 for implementing such functions. Examples of functions or actions that may be performed by the audio device in response to directives from the command interpreter 138 include playing music or other media, setting conditional alarms or notifications, increasing/decreasing the volume of the speaker 112, generating audible speech through the speaker 112, initiating certain types of communications with users of similar devices, performing actions relating to home automation, obtaining and playing or presenting content, and so forth.

Note that the control service 108 may also perform functions, in response to speech recognized from received audio, that involve entities or devices that are not shown in FIG. 1. For example, the control service 108 may interact with other network-based services to obtain information or services on behalf of the user 106. Furthermore, the control service 108 may itself have various elements and functionality that may be responsive to speech uttered by the user 106.

In some situations, commands provided by the control service 108 may specify actions that are to be performed by the audio device 102 in the future, in response to a specified stimulus. In these situations, a command provided by the control service 108 to the audio device 102 may specify a stimulus and an accompanying action. The audio device 102 receives the command and configures the stimulus responder 126 accordingly, to monitor for occurrence of the stimulus and to perform the action in response to detecting the stimulus.

The control service 108 may also expose or make available a user interface 140, which is accessible to the user 106 through means that are independent of the audio device 102. For example, the user interface 140 may be accessible through an application running on a user device 142 other than the audio device 102, such as a smartphone, tablet computer, or other portable computing device having network connectivity. As another example, the user interface 140 may be accessible through a browser or other graphical interface of any computer or computer-like device, including personal computers, portable computers, tablets, media devices, smartphones, and so forth. In some cases, the user interface 140 may comprise a web page generated for display by an Internet browser, and may thus be accessible through any device capable of displaying web content. In other cases, the user interface 140 may be accessed and/or displayed through an application installed on the user device 142. As a further example, the user interface may comprise a dedicated application running on a mobile device or any other device, utilizing an associated display panel of the device. In some case, the device 142 may communicate with the audio device 102 directly, without going through the control service 108. In other cases, elements of the control service 108 may be implemented by the user device 142.

The user interface 140 and the user device 142 interact to form a graphical or graphics-based user interface through which the user may interact with the control service 108. The user interface 140 may allow the user to configure various operational aspects of the system 100, including notifications and other conditional or stimulus-based actions.

As a specific example, the user 106 may access the user interface 140 to request stimulus-based actions that are to be performed by the audio device 102. For example, the user may specify a stimulus and a corresponding action that is to be performed by the audio device 102 in response to detecting the stimulus. As a more specific example, the user may specify as a stimulus a time of day, a time period, a recurring time, etc., at which an alarm, notification, or other action is to be implemented.

The control service 108 may respond to receiving the user request by attempting to contact the audio device 102 through the communications network 116 and by instructing the stimulus responder 126 to implement the conditional action specified by the request. In some cases, however, it may not be possible to contact or communicate with the audio device 102 through the network 116. This may happen when the audio device is unpowered or when there is a network outage. In these cases, the control service 108 may cancel the request from the user and may notify the user through the user interface 140 that the stimulus-based action has not been successfully set or scheduled at the audio device. In some embodiments, the request may be canceled only when the requested action is considered a priority action, such as a wake-up alarm. In the case of non-priority actions, which may be safely postponed or which may be of less consequence if not performed, the user request may be queued and implemented at the audio device 102 upon resumption of communications with the audio device 102.

Figure 2:
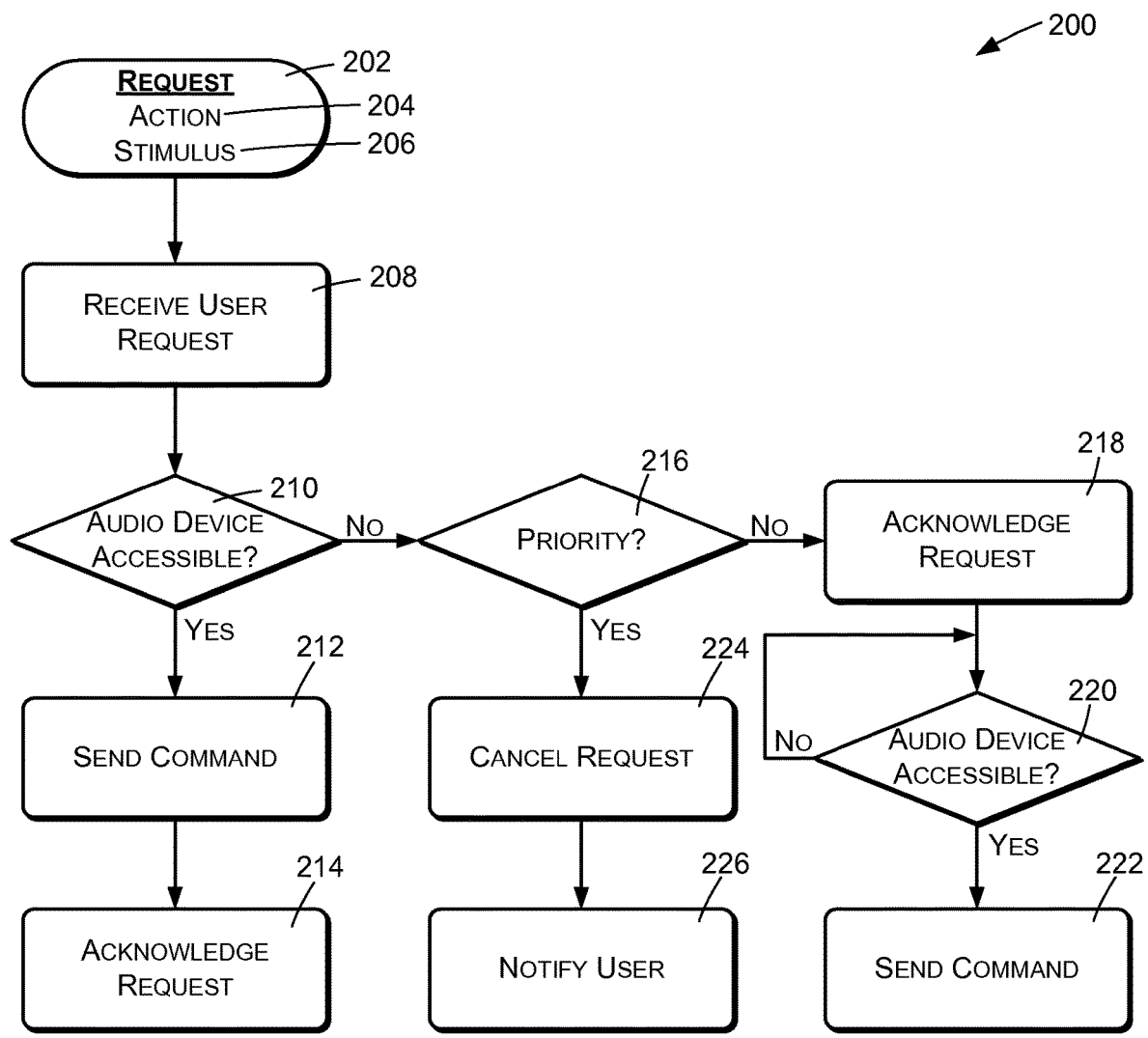
FIG. 2 is a flow diagram illustrating an example of information flow between the components shown in FIG. 1.

FIG. 2 illustrates an example method 200 involving operations and interactions between the audio device 102, the control service 108, and the personal user device 142. The acts shown in FIG. 2 may in many embodiments be performed by the control service 108, although responsibilities may be assigned differently in different embodiments. In some cases, for example, the user device 142 may communicate directly with the audio device 102, without the control service 108.

An action request 202 is formulated or defined by a user by interacting with a user interface, which may be implemented as described above in conjunction with the portable user device 142. The request 202 may specify an action 204 and a corresponding stimulus 206.

The request 202 may comprise a notification request, for scheduling a notification, and may specify the type of notification to be performed or issued by and/or from the audio device 102 upon occurrence of the stimulus. In some situations the stimulus 206 may comprise a time in the future, a time-of-day, or a recurring time. In other situations the stimulus 206 may comprise an environmental condition within the environment 104 of the user 106, a status of a device or information source, or an event that is detectable by the audio device 102. The action 204 may comprise an audio notification such as an alarm, which may be issued by playing a sound, music, tones, or other audio content at the audio device 102. The action 204 indicated by the request 202 may comprise one or more of many different functions that the audio device 102 is capable of performing, such as playing audio, controlling one or more devices within a home, performing other home automation functions, and so forth.

The request 202 may initially be designated by the user 106 through the graphical user interface 140 presented on a display of the personal user device 142. The request 202 may then be provided to and received by the control service 108.

An act 208 comprises receiving the request 202 at the control service 108 from the user 106 and/or from the user device 142.

An act 210 comprises determining whether the audio device 102 is currently accessible by the control service 108. This may comprise determining whether communications are currently available between the control service 108 and the audio device 102. While communications may normally be available, this might not be the case in certain situations. For example, the audio device 102 may be temporarily unpowered or turned off. As another example, the audio device 102 may have temporarily lost its ability to connect to the local network of the user 106. As yet another example, the wide-area network 116 may be experiencing problems or components of the control service 108 may be temporarily down.

If the audio device 102 is accessible the control service 108 performs an act 212 of formulating and sending a command to the audio device 102. The command instructs the audio device to perform the action 204 specified by the request 202 in response to the stimulus 206 specified by the request 202. An act 214 is then performed of acknowledging implementation and/or scheduling of the request 202. This may comprise notifying the user 102 that the activity has been scheduled or set. For example, a confirmation message may be presented on the graphical user interface 140 and/or the user device 142, indicating successful scheduling of the user request 202.

If the audio device 102 is not accessible the control service 108 performs an act 216, comprising determining whether the action 204 of the request 202 is of a first type. Actions of the first type, such as alarms, may be considered more important than other types of actions and may in some cases be referred to as priority action. Priority actions are those that are relatively significant to the user and that may be considered to represent system failures if not properly and timely implemented. A wake-up alarm or other alarm, for example, needs to be reliably implemented to prevent the user from missing appointments. Actions of other types may be less critical. For example, certain notifications may be merely informational, and may not prompt the user to take any particular action. Certain home automation actions, similarly, may be relatively less important. For example, scheduling lights to dim at a certain time may not be considered a priority action by the user 106, or may have a lower priority than actions such as alarms.

In some cases the user 106 may specify whether the action 204 is a priority action. In other cases, the control service 108 may designate different types of actions as being priority or non-priority actions based on predefined rules or classifications. For example, notifications and alerts may be predefined or pre-classified as priority actions in some embodiments. In some embodiments machine learning techniques may be used to classify actions of different types based observed behaviors of a single user, of a subset of users, or of all users.

If the requested action 204 is not a priority action, an act 218 is performed of acknowledging the request 202 to the user 106. This may comprise notifying the user 106 that the action 204 has or will be scheduled or set. For example, a confirmation message may be presented on the graphical user interface 140 by the user device 142, indicating that the request 202 will be implemented. In some cases, the confirmation message may indicate that implementation is merely pending, and that the request 202 will be scheduled when possible, when communications become available with the audio device 102.

After the acknowledgement 218 an act 220 is performed of determining whether the audio device 102 has become accessible. When the audio device 102 becomes accessible, an act 222 is performed of sending a command to the audio device 102, instructing the audio device 102 with regard to the stimulus 206 and action 204 specified of the user request 202. Specifically, the command instructs the audio device 102 to perform the action 204 of the request 202 in response to detection or occurrence of the accompanying stimulus 206.

Returning to the act 216, if the action 204 is not a priority action an act 224 is performed of cancelling the request 202. In this case, the control service 108 does not make further attempts to implement or schedule the request 202 at the audio device 102. An act 226 is performed of notifying the user that the request 202 has been canceled. The cancellation notification may be implemented as a message on the graphical user interface 140 displayed by the user device 142.

In summary, upon receiving a user request to schedule a stimulus-based action, the control service 108 sends an appropriate command to the audio device 102 if communications are currently available, and acknowledges the user request. If communications are not currently available and the request specifies a priority action, the user request is rejected or canceled. This allows the user to find an alternate means of accomplishing his or her goal.

In the cases of a non-priority action, the request is saved and the control service 108 continues to try to contact and establish communications with the audio device 102. When communications become available, the user request is implemented by instructing the audio device 102 to perform the requested action in response to the accompanying stimulus.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
a network-based control service configured to (a) receive an audio signal using an audio interface device, (b) recognize user speech in the audio signal, (c) determine user intent from the user speech, and (d) generate directive data based at least in part on the user intent;
a graphical interface accessible through a device other than the audio interface device, the graphical interface configured to receive a request that specifies a future time at which an action is to be performed by the audio interface device;
the network-based control service being further configured to:
determine that the audio interface device is inaccessible by the network-based control service;
determine that the request is unfulfilled based at least in part on determining that the audio interface device is inaccessible by the network-based control service;
determine, based at least in part on determining that the request is unfulfilled, that the request represents at least one of an informational request or a home-automation request;
cause the graphical interface to display a request acknowledgement indicating the request is scheduled for fulfillment at a time at or after when the audio interface device becomes accessible by the network-based control service;
determine that the audio interface device has become available to the network-based control service; and
send, to the audio interface device and based at least in part on determining that the audio interface device has become available to the network-based control service, a command to perform the action at the future time.

2. The device of claim 1, wherein the at least one of the informational request or the home-automation request are associated with a non-priority classification of requests predefined by a user associated with the device.

3. The device of claim 1, the network-based control service configured to provide a notification that the request has been accepted based at least in part on sending the command.

4. A system comprising:
one or more processors; and
one or more non-transitory computer-readable media storing computer-executable instructions that, when executed, cause the one or more processors to perform acts comprising:
receiving a request to perform, at an audio device, an action in response to a specified stimulus;
determining that communications with a control service are unavailable;
determining that the request is unsuccessful based at least in part on the determining that the communications with the control service are unavailable;
determining, based at least in part on determining that the request is unsuccessful, that the request represents at least one of an information request or a home-automation request;
causing a graphical interface to display a request acknowledgement indicating the request is scheduled for fulfillment at a time at or after when the audio device becomes accessible by the control service;
determining that the audio device has become available to the control service; and
sending, to the audio device and based at least in part on determining that the audio device has become available to the control service, a command to perform the action in response to the specified stimulus.

5. The system of claim 4, wherein the specified stimulus comprises a time in the future.

6. The system of claim 4, wherein the action comprises an audio notification.

7. The system of claim 4, wherein communicating with the control service is performed using a wide-area network.

8. The system of claim 4, wherein the request is received from the audio device.

9. The system of claim 4, wherein:
the audio device includes a speech-based interface; and
the device includes at least one of a text-based or graphics-based interface.

10. The system of claim 4, wherein determining that communications with the control service are unavailable comprises determining that communications with the control service are unavailable based at least in part on an indication that a connection between a network and the audio device is absent.

11. The system of claim 4, wherein:
the informational request corresponds to a first intent to obtain information requested by a user in response to the specified stimulus; and
the home-automation request corresponds to a second intent to initiate a home-automation action in response to the specified stimulus.

12. The system of claim 4, the acts further comprising receiving priority data indicating that the at least one of the informational request or the home-automation request are classified as non-priority actions by a user, and wherein causing the graphical interface to display the indication that the request is pending is based at least in part on receiving the priority data.

13. The system of claim 4, the acts further comprising receiving priority data indicating that the at least one of the informational request or the home-automation request are classified as non-priority actions by the control service based at least in part on historical data associated with a user and another user, and wherein causing the graphical interface to display the indication that the request is pending is based at least in part on receiving the priority data.

14. The system of claim 4, the acts further comprising receiving priority data indicating that the at least one of the informational request or the home-automation request are classified as non-priority actions by the control service based at least in part on machine learning techniques utilizing data associated with previous requests by a user of the audio device.

15. A method, comprising:
receiving, at a first device from a second device including a user interface, a request that specifies a stimulus and an action that is to be initiated by the first device in response to the stimulus;
determining that communications between the first device and a remote system are unavailable;
determining that the request is unfulfilled based at least in part on determining that communications between the first device and the remote system are unavailable;
determining, based at least in part on determining that the request is unfulfilled, that the request represents at least one of an informational request or a home-automation request;
displaying, via the second device, a request acknowledgement indicating the request is scheduled to be fulfilled at a time at or after when communication between the first device and the remote system are available.

16. The method of claim 15, wherein the request comprises a first request, the stimulus comprises a first stimulus, the action comprises a first action, and further comprising:
receiving a second request that specifies a second stimulus and a second action that is to be initiated by the first device in response to the second stimulus;
determining that the second request is unsuccessful based at least in part on determining that the communications between the first device and the remote system are unavailable;
receiving third data indicating that the second request represents a set-alarm request; and
canceling the request based at least in part on the third data indicating that the second request represents the set-alarm request.

17. The method of claim 15, wherein the informational request and the home-automation request are associated with a request type predefined by a user of the first device.

18. The method of claim 15, wherein the informational request and the home-automation request are associated with a request type based at least in part on historical data representing historically-observed user behavior.

19. The method of claim 15, wherein the stimulus comprises an environmental condition.

20. The method of claim 15, wherein the action comprises controlling one or more devices within a home.

21. The method of claim 15, wherein the stimulus comprises a time and the action comprises an audio notification.

22. The method of claim 15, wherein communicating with the remote system is performed using a wide-area network.

23. The method of claim 15, wherein the second device comprises a portable computing device associated with a user.

24. The method of claim 15, wherein the first device includes a speech-based interface, and the second device includes at least one of a text-based or graphics-based interface.

* * * * *